US008512833B2

(12) United States Patent
Oh et al.

(10) Patent No.: US 8,512,833 B2
(45) Date of Patent: Aug. 20, 2013

(54) HEAT-SHRINKABLE POLYESTER FILM

(75) Inventors: Tae-Byoung Oh, Suwon-si (KR);
Tae-Hyoung Jung, Suwon-si (KR);
Nam Ill Kim, Suwon-si (KR)

(73) Assignee: SKC Co., Ltd, Suwon-si (KR)

( * ) Notice: Subject to any disclaimer, the term of this patent is extended or adjusted under 35 U.S.C. 154(b) by 306 days.

(21) Appl. No.: 12/992,544

(22) PCT Filed: May 15, 2009

(86) PCT No.: PCT/KR2009/002587
§ 371 (c)(1),
(2), (4) Date: Nov. 12, 2010

(87) PCT Pub. No.: WO2009/139598
PCT Pub. Date: Nov. 19, 2009

(65) Prior Publication Data
US 2011/0065893 A1    Mar. 17, 2011

(30) Foreign Application Priority Data

May 16, 2008  (KR) ........................ 10-2008-0045610

(51) Int. Cl.
| | |
|---|---|
| *B32B 27/36* | (2006.01) |
| *B65B 53/02* | (2006.01) |
| *C08G 63/137* | (2006.01) |
| *C08G 63/16* | (2006.01) |
| *C08G 63/18* | (2006.01) |
| *C08G 63/181* | (2006.01) |
| *C08G 63/183* | (2006.01) |
| *C08G 63/189* | (2006.01) |
| *C08G 63/199* | (2006.01) |
| *B29C 55/00* | (2006.01) |
| *B29C 55/10* | (2006.01) |
| *B29C 55/12* | (2006.01) |
| *B29C 55/14* | (2006.01) |

(52) U.S. Cl.
USPC ...... 428/35.1; 428/35.7; 428/36.92; 428/480; 428/910; 528/308; 528/308.1; 528/308.6; 528/308.7; 264/288.4; 264/290.2

(58) Field of Classification Search
None
See application file for complete search history.

(56) References Cited

U.S. PATENT DOCUMENTS 2,465,319 A * 3/1949 Dickson et al. .................. 526/71
3,554,976 A * 1/1971 Hull .............................. 528/301

(Continued)

FOREIGN PATENT DOCUMENTS

| CN | 1729235 A | 2/2006 |
|---|---|---|
| JP | 2002-046175 A | 2/2002 |

(Continued)

OTHER PUBLICATIONS

Japanese Patent Office, Japanese Office Action issued in corresponding JP Application No. 2011-509419, dated Jun. 26, 2012.

(Continued)

*Primary Examiner* — Vivian Chen
(74) *Attorney, Agent, or Firm* — Sughrue Mion, PLLC

(57) ABSTRACT

The present invention relates to a heat-shrinkable polyester film, which has a heat-shrinkage of 20% or more in both the longitudinal and transverse directions when treated with 80° C. water for 30 seconds and a bidirectional balance parameter in the range of 0.25 to 2.5 and exhibits an excellent properties in die-cutting and removing from a container such as a glass bottle for recycling by washing with hot water.

5 Claims, 1 Drawing Sheet

(56) References Cited

U.S. PATENT DOCUMENTS

| | | | |
|---|---|---|---|
| 4,020,141 A * | 4/1977 | Quinn et al. | 264/466 |
| 6,231,958 B1 * | 5/2001 | Kim et al. | 528/272 |
| 6,939,616 B2 * | 9/2005 | Hayakawa et al. | 428/480 |
| 2006/0063008 A1 * | 3/2006 | Inagaki et al. | 428/423.1 |

FOREIGN PATENT DOCUMENTS

| | | |
|---|---|---|
| JP | 2003-183422 A | 7/2003 |
| JP | 2007-216458 A | 8/2007 |
| JP | 2008-030371 A | 2/2008 |
| KR | 10-2001-0036457 A | 5/2001 |
| KR | 10-2005-0084532 A | 8/2005 |
| WO | WO 01/10928 * | 2/2001 |

OTHER PUBLICATIONS

Chinese Patent Office, Chinese Office Action issued in corresponding CN Application No. 200980116147.4, dated Jun. 8, 2012.

* cited by examiner

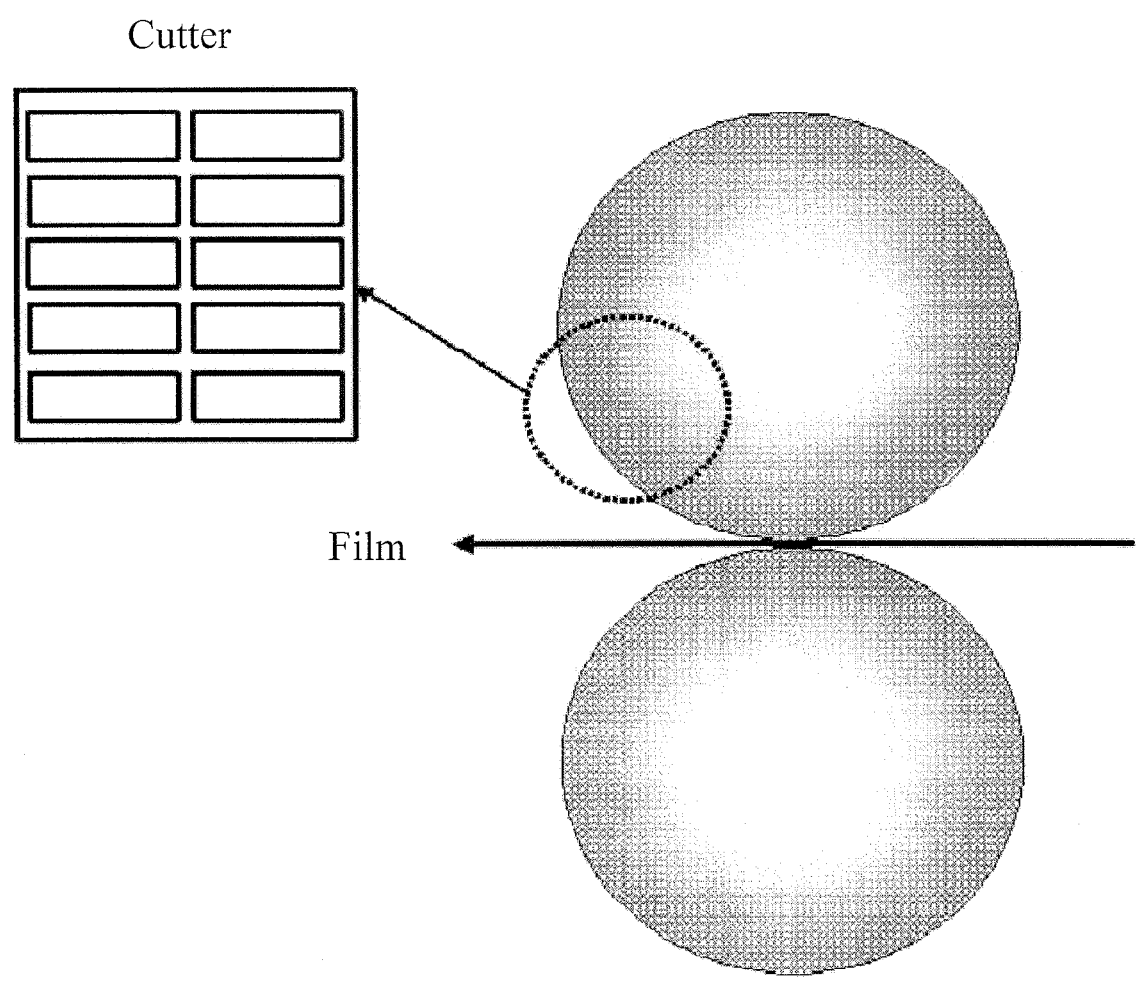

HEAT-SHRINKABLE POLYESTER FILM

FIELD OF THE INVENTION

The present invention relates to a heat-shrinkable polyester film which is useful for use as an adhesive label for a container such as a glass bottle.

BACKGROUND OF THE INVENTION

Heat-shrinkable films formed of polyvinyl chloride or polystyrene have been extensively used as a shrinkable film for labeling bottles. Such conventional heat-shrinkable films, however, have problems in that a polyvinyl chloride film generates chlorine-based gas when burned and a polystyrene film has poor printability. Also, in recycling PET bottles, non-PET labels have to be removed therefrom in advance. To solve such problems, there have been developed heat-shrinkable polyester films.

A glass bottle labeled with a heat-shrinkable film, on the other hand, is difficult to recycle because individual or business consumers must remove labels before recycling, or a label remover must be employed. Therefore, glass bottles have been commonly labeled with a paper label which can be easily removed from the bottle by washing.

Recently, a label for glass bottles which is prepared by die-cutting a uniaxially heat-shrinkable film after printing and coating has been developed. Such heat-shrinkable adhesive label can be easily removed from a glass bottle due to its shrinking property by washing with hot water.

However, the conventional heat-shrinkable label prepared using uniaxially film has the problems of a poor die-cutting property and an unsatisfactory removal rate from a glass bottle.

SUMMARY OF THE INVENTION

Accordingly, it is an object of the present invention to provide a heat-shrinkable polyester film which has a satisfactory die-cutting property in preparation of an adhesive label and an improved shrinkage in both the longitudinal and transverse directions so that it can be removed easily from a recycling container by washing at a considerably reduced cost.

In accordance with one aspect of the present invention, there is provided a heat-shrinkable polyester film having a heat-shrinkage of 20% or more in both the longitudinal and transverse directions when treated with 80° C. water for 30 seconds, and a bidirectional balance parameter A of formula (1) in the range of 0.25 to 2.5:

$$A=(M_D-M_S)/(T_D-T_S) \quad (1)$$

in which, A is the bidirectional balance parameter; $M_D$ and $T_D$ are elongations (%) at break in the longitudinal and transverse directions, respectively; $M_S$ and $T_S$ are strengths (kg/mm$^2$) at break in the longitudinal and transverse directions, respectively, A being calculated with the numerical values of $M_D$, $M_S$, $T_D$, and $T_S$ as defined above, disregarding the units thereof.

The heat-shrinkable polyester film according to the present invention has a good die-cutting property which facilitates preparation of an adhesive label, and can be easily removed from a container such as a glass bottle for recycling at a considerably reduced cost.

BRIEF DESCRIPTION OF THE DRAWINGS

The above and other objects and features of the present invention will become apparent from the following description of the invention, when taken in conjunction with the accompanying drawing, which shows:

FIG. 1: a schematic drawing for evaluating a die-cutting property of a film using a Thompson cutter.

DETAILED DESCRIPTION OF THE INVENTION

Hereinafter, the present invention is described in detail.

The heat-shrinkable polyester film of the present invention has a heat-shrinkage of 20% or more, preferably 25 to 60%, in both the longitudinal and transverse directions when treated with 80° C. water for 30 seconds. The inventive film has a bidirectional balance parameter A of the formula (1) in the range of 0.25 to 2.5. When the bidirectional balance parameter is either less than 0.25 or more than 2.5, the molecular arrangement becomes set in line with one direction (longitudinal or transverse direction) so that the die-cutting property deteriorates or the bidirectional shrinkage decreases to lower the removal rate when washed.

The polyester resin used in the heat-shrinkage polyester film of the present invention may be prepared by reacting an acid component such as terephthalic acid, isophthalic acid, and naphthalene dicarboxylic acid with a diol component such as ethylenediol, propanediol, butanediol, hexanediol, ethylene glycol, neopentyl glycol, and 1,4-cyclohexanedimethanol. Preferably, the diol component comprises at least one $C_{3-6}$diol selected from the group consisting of propanediol, butanediol, hexanediol, and neopentyl glycol, among which neopentyl glycol is the most preferable. The polyester resin used in the inventive film preferably has a glass transition temperature (Tg) of 55 to 85° C.

The heat-shrinkable polyester film of the present invention may comprise one of the polyesters listed above or a polyester blend in which two or more polyesters mixed.

Preferably, the heat-shrinkable polyester film of the present invention comprises a polyethylene terephthalate repeating unit in an amount of 60 to 95 wt % based on the total weight of the film.

The heat-shrinkable polyester film of the present invention may be prepared by drawing in the longitudinal and transverse directions, either simultaneously or sequentially. The drawing ratios in both the longitudinal and transverse directions are preferably in the range of 2.5 to 4.5, more preferably 3.0 to 4.0.

The difference of the drawing ratios in the longitudinal and transverse directions is preferably 1.0 or less. When the difference falls within the above range, the film can be die-cut more uniformly in the longitudinal and transverse directions.

The drawing in the transverse direction may be conducted in a conventional manner, but preferably conducted in two stages having a neutral section therebetween so as to enhance the die-cutting property.

The drawing temperature is preferably in the range of 80 to 120° C.

Preferably, after the drawing process as above, the film is cooled at a temperature which is lower than the glass transition temperature (Tg) of the feedstock polyester resin so as to enhance a smoothness of the final film.

The heat-shrinkable polyester film of the present invention may further comprise other additives such as inorganic or organic lubricant for enhancing slipperiness, coloring agent, antioxidant, compatibilizer, antistatic agents, and UV absorber, to the extent they do not adversely affect the film properties.

A thickness of the heat-shrinkable polyester film of the present invention is not limited, but preferably 10 to 200 μm, more preferably 30 to 60 μm when used as a heat-shrinkable film for a label.

The heat-shrinkable polyester film of the present invention exhibits a good die-cutting property when used in preparation of an adhesive label from the adhesive-coated film and has a high removal rate when washed with hot water for recycling a container such as a glass bottle labeled therewith. Accordingly, the inventive film is very useful for use as an adhesive label for a reusable glass bottle as well as other use such as shrinkable plastic wrap, bundle wrap, and so on.

EXAMPLES

Hereinafter, the following examples are intended to illustrate the present invention. However, these examples are not to be construed to limit the scope of the invention.

Example 1

100 parts by mole of dimethyl terephthalate, 20 parts by mole of neopentyl glycol, and 80 parts by mole of ethylene glycol were copolymerized to prepare a polyester resin (Tg: 70-75° C.), and then, an inorganic lubricant for enhancing driving property was added thereto in an amount corresponding to 400 ppm. The polyester resin was then melted at 280° C., extruded through a T-die, and cooled using a casting roller, to obtain an undrawn film.

The undrawn film was drawn in the longitudinal direction at a drawing ratio of 3.6 using preheated rolls at 85° C. having different peripheral velocities. The resulting film was then drawn in the transverse direction at a drawing ratio of 3.6 using a tenter with blowing hot air at 95 to 105° C., passed through a neutral section, and then further drawn at a drawing ratio of 1.1 with blowing hot air at 85 to 95° C. (total drawing ratio: 3.6×1.1.) The drawn film was cooled at 60° C. without further heat-treatment to prepare the final film.

Example 2

The undrawn film obtained by the same procedures as in Example 1 was drawn in the longitudinal direction at a drawing ratio of 3.4 using preheated rolls at 85° C. having different peripheral velocities. The resulting film was then drawn in the transverse direction at a drawing ratio of 4.0 using a tenter with blowing hot air at 95 to 105° C. The drawn film was cooled at 60° C. without further heat-treatment to prepare the final film.

Comparative Example 1

The undrawn film obtained by the same procedures as in Example 1 was drawn in the transverse direction at a drawing ratio of 4.5 using a tenter with blowing hot air at 95 to 105° C. without drawing in the longitudinal direction. The drawn film was heat-treated at 85° C. to prepare the final film.

Comparative Example 2

The undrawn film obtained by the same procedures as in Example 1 was drawn in the longitudinal direction at a drawing ratio of 1.5 using preheated rolls at 80° C. having different peripheral velocities. The resulting film was then drawn in the transverse direction at a drawing ratio of 4.0 using a tenter with blowing hot air at 95 to 105° C. The drawn film was heat-treated at 85° C. to prepare the final film.

Comparative Example 3

The procedures of Example 2 were repeated except that the heat-treatment was not conducted, to prepare the final film.

Comparative Example 4

The undrawn film obtained by the same procedures as in Example 1 was drawn in the longitudinal direction at a drawing ratio of 3.5 using preheated rolls at 85° C. having different peripheral velocities. The resulting film was then drawn in the transverse direction at a drawing ratio of 2.0 using a tenter with blowing hot air at 95 to 105° C. The drawn film was heat-treated at 85° C. to prepare the final film.

The processes for preparing the final film from an undrawn film were summarized in Table 1.

TABLE 1

| Process | | Example | | Comparative Example | | | |
|---|---|---|---|---|---|---|---|
| | | 1 | 2 | 1 | 2 | 3 | 4 |
| Drawing in the longitudinal direction | Temp.(° C.) | 85 | 85 | x | 80 | 80 | 85 |
| | Drawing ratio | 3.6 | 3.4 | x | 1.5 | 1.5 | 3.5 |
| Drawing in the transverse direction | 1st Temp.(° C.) | 95-105 | 95-105 | 95-105 | 95-105 | 95-105 | 95-105 |
| | Drawing ratio | 3.6 | 4.0 | 4.5 | 4.0 | 4.0 | 2.0 |
| | 2nd Temp.(° C.) | 85-95 | x | x | x | x | x |
| | Drawing ratio | 1.1 | x | x | x | x | x |
| Heat-treatment | Temp.(° C.) | x | x | 85 | 85 | x | 85 |
| Cooling | Temp.(° C.) | 60 | 60 | x | x | x | x |

Test

The heat-shrinkable polyester films prepared in the examples and comparative examples were evaluated by the following methods and the results are summarized in Table 2.

(1) Strength and Elongation at Break

The strength (kg/mm$^2$) and elongation (%) at break were measured according to ASTM D 882 using a 100 mm×15 mm film sample at an elongation rate of 200 mm/min and an interval between chucks of 50 mm with a universal tester (UTM 4206-001, available from Instron Inc.) The same procedures as above were repeated 5 times in the longitudinal and transverse directions, respectively, to obtain average values.

(2) Bidirectional Balance Parameter

Using the results of Test (1) above, bidirectional balance parameter (A)=$(M_D-M_S)/(T_D-T_S)$ was calculated (wherein, $M_D$ and $T_D$ are elongations (%) at break in the longitudinal and transverse directions, respectively, $M_S$ and $T_S$ are strengths at break (kg/mm$^2$) in the longitudinal and transverse directions, respectively, A being calculated with the numerical values of $M_D$, $M_S$, $T_D$, and $T_S$ as defined above, disregarding the units thereof.)

(3) Heat Shrinkage Ratio

A film specimen of 10×10 cm was obtained by cutting in line with the primary shrinkage direction, the film specimen was put into 70, 80, 90 or 100° C. water for 30 seconds, the change in the film length in the longitudinal or transverse direction was measured, and the heat-shrinkage was calculated by the following formula:

Heat-shrinkage (%)=(Length before heat-treatment–Length after heat-treatment)/Length before heat-treatment×100

(4) Die-Cutting Property

Using a Thompson cutter which is generally used in die-cutting process, a film was die-cut into at least 1000 pieces to calculate the defective rate for no-cut pieces.

Good: defective rate of 2% or less
Decent: defective rate of 2~5%
Poor: defective rate of 5% or more (5) Label Removal Rate A film was coated with an adhesive layer and die-cut to obtain adhesive labels, and then at least 1000 glass bottles were labeled with the adhesive labels. After 3 days, the labeled glass bottles were heat-treated with 80° C. water for 30 seconds, and the glass bottles whose label was removed were counted to obtain the label removal rate.

Good: removal rate of 99% or more
Decent: removal rate of 97~99%
Poor: removal rate of 97% or less the inventive film has a good processability in preparation of an adhesive label and can be easily removed from a container for recycling.

While the embodiments of the subject invention have been described and illustrated, it is obvious that various changes and modifications can be made thereto by those of ordinary skill in the art without departing from the spirit and scope of the present invention which should be limited only by the scope of the appended claims.

What is claimed is:

1. A heat-shrinkable polyester film having a heat-shrinkage of 20% or more in both the longitudinal and transverse directions when treated with 80° C. water for 30 seconds, and a bidirectional balance parameter A of formula (I) in the range 1.16 to 1.19:

$$A=(M_D-M_S)/(T_D-T_S) \quad (1)$$

in which, A is the bidirectional balance parameter; $M_D$ and $T_D$ are elongations (%) at break in the longitudinal and transverse directions, respectively; $M_S$ and $T_S$ are strengths (kg/mm$^2$) at break in the longitudinal and transverse directions, respectively, A being calculated with the numerical values of $M_D$, $M_S$, $T_D$, and $T_S$ as defined above, disregarding the units thereof, wherein the heat-shrinkable polyester film is drawn in both the longitudinal and transverse directions at a drawing ratio of 2.5 to 4.5, the difference of the drawing ratios in the longitudinal and transverse directions is 1.0 or less, and the heat-shrinkable polyester film is (i) drawn in the longitudinal direction, (ii) drawn in the transverse direction, and (iii) further drawn in the transverse direction after being passed through a neutral section.

2. The heat-shrinkable polyester film of claim 1, wherein the feedstock polyester resin is prepared by reacting an acid component selected from the group consisting of terephthalic acid, isophthalic acid, and naphthalene dicarboxylic acid with a diol component selected from the group consisting of ethylenediol, propanediol, butanediol, hexanediol, ethylene glycol, neopentyl glycol, and 1,4-cyclohexanedimethanol.

3. The heat-shrinkable polyester film of claim 1, which comprises a polyethylene terephthalate repeating unit in an amount of 60 to 90 wt % based on the total weight of the film.

TABLE 2

| Test | | | Example 1 | Example 2 | Comparative Example 1 | Comparative Example 2 | Comparative Example 3 | Comparative Example 4 |
|---|---|---|---|---|---|---|---|---|
| Strength at break (kg/mm$^2$) | | L.D. | 22 | 20 | 6 | 12 | 12 | 21 |
| | | T.D. | 23 | 29 | 20 | 21 | 20 | 14 |
| Elongation at break (%) | | L.D. | 126 | 115 | 542 | 410 | 400 | 106 |
| | | T.D. | 110 | 100 | 85 | 110 | 105 | 380 |
| Bidirectional balance parameter | | | 1.19 | 1.16 | 8.2 | 4.47 | 4.56 | 0.23 |
| Heat-shrinkage (%) | 70° C. | L.D. | 16 | 13 | 1.0 | 5 | 5 | 15 |
| | | T.D. | 37 | 35 | 32 | 35 | 38 | 10 |
| | 80° C. | L.D. | 36 | 31 | 1.0 | 13 | 13 | 32 |
| | | T.D. | 60 | 55 | 68 | 64 | 68 | 15 |
| | 90° C. | L.D. | 42 | 35 | 1.5 | 18 | 18 | 38 |
| | | T.D. | 67 | 62 | 75 | 72 | 74 | 21 |
| | 100° C. | L.D. | 43 | 36 | 1.0 | 19 | 19 | 43 |
| | | T.D. | 70 | 65 | 76 | 74 | 75 | 26 |
| Die-cutting property | | | Good | Poor | Poor | Poor | Poor | Poor |
| Label removal rate | | | Good | Good | Poor | Decent | Decent | Decent |

* L.D.: longitudinal direction, T.D.: transverse direction

As shown in Table 1, the inventive films of Examples 1 and 2 have a bidirectional balance parameter in the range of 0.25 to 2.5 and exhibit more excellent properties in bidirectional heat-shrinkage, die-cutting and label removal in comparison with the films of Comparative Examples 1 to 4. Accordingly, 4. The heat-shrinkable polyester film of claim 1, which is drawn at a temperature in the range from 80 to 120° C.

5. The heat-shrinkable polyester film of claim 1, which is prepared by drawing and then cooling at a temperature which is lower than the glass transition temperature (Tg) of the feedstock polyester resin.

* * * * *